(12) United States Patent
Sandy et al.

(10) Patent No.: US 7,516,263 B2
(45) Date of Patent: Apr. 7, 2009

(54) RE-CONFIGURABLE PCI-EXPRESS SWITCHING DEVICE

(75) Inventors: Douglas L. Sandy, Chandler, AZ (US); Scott J. Fabini, Pheonix, AZ (US)

(73) Assignee: Emerson Network Power - Embedded Computing, Inc., Madison, WI (US)

( * ) Notice: Subject to any disclaimer, the term of this patent is extended or adjusted under 35 U.S.C. 154(b) by 418 days.

(21) Appl. No.: 11/364,418

(22) Filed: Feb. 27, 2006

(65) Prior Publication Data
US 2007/0204095 A1   Aug. 30, 2007

(51) Int. Cl.
*G06F 13/00* (2006.01)
(52) U.S. Cl. .................. 710/316; 710/301; 710/315; 710/38; 710/2
(58) Field of Classification Search ......... 710/311–317, 710/8–12, 300–304; 439/59–61; 361/788, 361/686
See application file for complete search history.

(56) References Cited

U.S. PATENT DOCUMENTS

| | | | | |
|---|---|---|---|---|
| 5,892,932 A * | 4/1999 | Kim | ........................... | 710/316 |
| 7,046,668 B2 * | 5/2006 | Pettey et al. | ................ | 370/392 |
| 7,058,738 B2 * | 6/2006 | Stufflebeam, Jr. | ........... | 710/104 |
| 7,083,422 B2 * | 8/2006 | Campini et al. | ............... | 439/61 |
| 7,120,711 B2 * | 10/2006 | Schaefer et al. | ............. | 710/104 |
| 2003/0142483 A1 * | 7/2003 | Iny | ............................. | 361/788 |
| 2003/0236920 A1 * | 12/2003 | Harris et al. | ................ | 709/253 |
| 2007/0186088 A1 * | 8/2007 | Khatri et al. | ................... | 713/1 |

OTHER PUBLICATIONS

"PCI Express™ Base Specification Revision 1.0", PCI Express, Jul. 22, 2002, pp. 1-422.

\* cited by examiner

*Primary Examiner*—Raymond N Phan
(74) *Attorney, Agent, or Firm*—Harness, Dickey & Pierce, P.L.C.

(57) ABSTRACT

A configurable switching device includes a switch card coupled to interface with a backplane of a computer chassis, a plurality of PCI-Express switching elements coupled to the switch card, and a configuration means coupled to the switch card, where the configuration means is operable to configure and reconfigure the plurality of PCI-Express switching elements to operate in a plurality of directional fabric domains, and where each of the plurality of PCI-Express switching elements can operate in only one of the plurality of directional fabric domains at a time.

28 Claims, 3 Drawing Sheets

US 7,516,263 B2

RE-CONFIGURABLE PCI-EXPRESS SWITCHING DEVICE

BACKGROUND OF INVENTION

Although the PCI (Peripheral Component Interconnect) Bus has been widely used as a general purpose I/O interconnect standard over the last ten years, it is beginning to hit the limits of its capabilities. Extensions to the PCI standards, such as 64-bit slots and clock speeds of 66 MHz or 100 MHz, have been made, but cannot continue to meet the rapidly increasing bandwidth demands in PCs over the next few years. PCI Express™ has been recently developed to meet this challenge and takes the form of a serial bus architecture.

MicroTCA and AdvancedTCA provided PCI-Express™ switched fabric connectivity. In these platforms, PCI-Express™ switching is supplied by a central switching function for the entire chassis and a processing "root complex" provides the control function. The central switching function creates one continuous domain of PCI-Express™ within the chassis.

The prior art PCI-Express™ switching functions do not allow for multiple, smaller PCI-Express™ domains within a chassis rather than a single unified domain. This is a limitation in multiprocessing systems where multiple control functions are useful. Further, the number and size of these smaller domains will vary from application to application. Currently, there is no method of reconfiguring a PCI-Express™ switching function by a user subsequent to manufacturing. This has the disadvantage of making it difficult for a user to customize and modify the number and size of PCI-Express™ domains within a chassis.

There is a need, not met in the prior art, of a method and apparatus to allow the number and size of PCI-Express™ domains to be varied by a user. Accordingly, there is a significant need for an apparatus that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
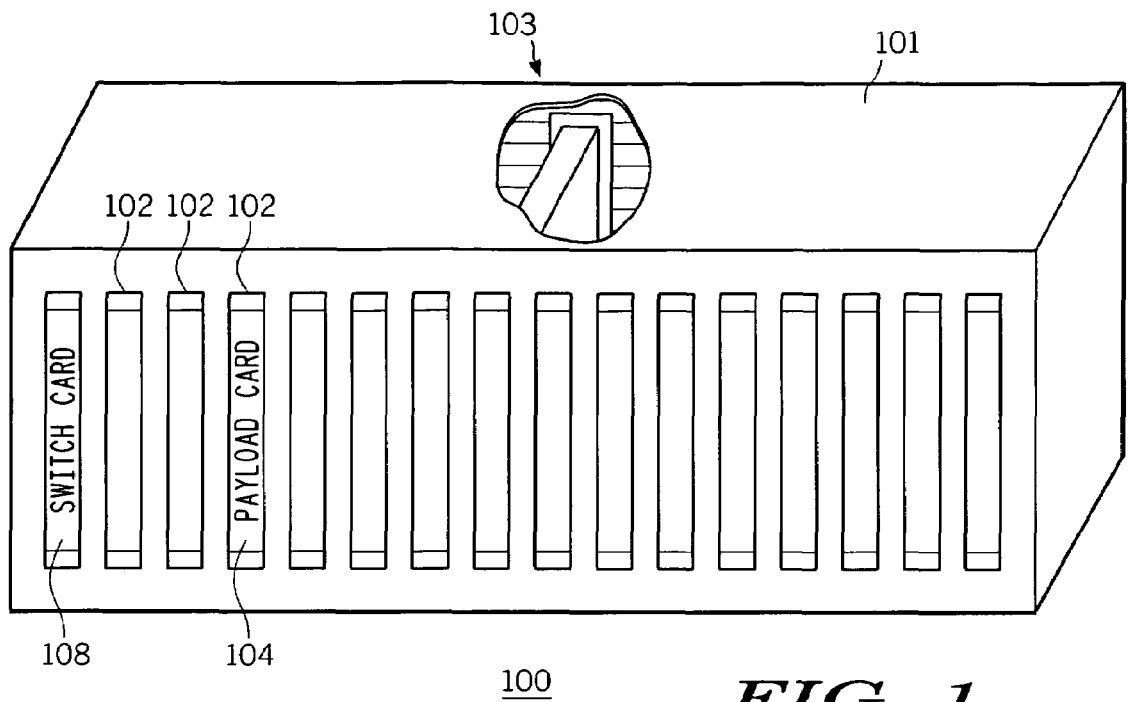
FIG. 1 representatively illustrates computer system in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

The terms "a" or "an", as used herein, are defined as one, or more than one. The term "plurality," as used herein, is defined as two, or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software," and the like as used herein, are defined as a sequence of instructions designed for execution on a computer system. A program, computer program, or software may include a subroutine, a function, a procedure, an object method, an object implementation, an executable application, an applet, a servlet, an object code, a shared library/dynamic load library and/or other sequence of instructions designed for execution on a computer system. A component may include a computer program, software, or one or more lines of computer readable processing instructions.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

By way of background, Peripheral Component Interconnect (PCI) was developed in the early 1990's as a general I/O architecture to transfer data and instructions faster than the ISA architecture of the time. PCI has gone through several improvements since that time, with the latest proposal being PCI Express™. In a nutshell, PCI Express™ is a replacement of the PCI and PCI-X bus specification to provide platforms with much greater performance, while using a much lower pin count (Note: PCI and PCI-X are parallel bus architectures, PCI Express™ is a serial bus architecture). A complete discussion of PCI Express™ is beyond the scope of this specification, but a thorough background and description can be found in the following books which are incorporated herein by reference: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In addition, the PCI Express™ base specification is managed and disseminated through the Special Interest Group (SIG) for PCI found at www.pcisig.com.

FIG. 1 representatively illustrates computer system 100 in accordance with an exemplary embodiment of the present invention. As shown in FIG. 1, computer 100 may include a computer chassis 101 having a backplane 103, with software and a plurality of slots 102 for inserting cards, for example, switch cards 108 and payload cards 104. Backplane 103 may be used for coupling cards placed in plurality of slots 102 to facilitate data transfer and power distribution. In an embodiment, backplane 103 may comprise for example and without limitation, 100-ohm differential signaling pairs.

As shown in FIG. 1, computer system 100 may comprise at least one switch card 108 coupled to any number of payload cards 104 via backplane 103. Backplane 103 may accommodate any combination of a packet switched backplane including a distributed switched fabric, or a multi-drop bus type backplane. Backplane architectures may include, but are not limited to, CompactPCI, Advanced Telecom Computing Architecture (AdvancedTCA), MicroTCA, and the like.

Payload cards 104 may add functionality to computer system 100 through the addition of processors, memory, storage devices, I/O elements, and the like. In other words, payload card 104 may include any combination of processors, memory, storage devices, I/O elements, and the like, to give computer system 100 any functionality desired by a user. Carrier cards are payload cards that are designed to have one or more mezzanine cards plugged into them to add even more modular functionality to the computer system 100. Mezzanine cards are different from payload cards in that mezzanine cards are not coupled to physically connect directly with the backplane, whereas payload cards function to physically directly connect with the backplane 103.

In the embodiment shown, there are sixteen slots 102 to accommodate any combination of switch cards 108 and payload cards 104. However, a computer system 100 with any number of slots, including a motherboard-based system with no slots, may be included in the scope of the invention.

In an embodiment, computer system 100 can use switch card 108 as a central switching hub with any number of payload cards 104 coupled to switch card 108. Computer system 100 may support a point-to-point, switched input/output (I/O) fabric. Computer system 100 may be implemented by using a switched fabric network standards, for example PCI-Express™.

In an embodiment, computer system 100 and computer chassis 101 may be an embedded computer chassis. For example, computer system 100 and computer chassis 101 may comply with the Advanced Telecom and Computing Architecture (ATCA™) standard as defined in the PICMG 3.0 AdvancedTCA specification, where switch devices and payload modules are used in a switched fabric. In another embodiment, computer system 100 and embedded computer chassis 101 may comply with CompactPCI standard. In yet another embodiment, computer system 100 and embedded computer chassis 101 may comply with the MicroTCA standard as defined in PICMG® MicroTCA.0 Draft 0.9—Micro Telecom Compute Architecture Base Specification (and subsequent revisions). The embodiment of the invention is not limited to the use of these standards, and the use of other standards is within the scope of the invention.

In the MicroTCA implementation of an embodiment, computer system 100 is a collection of interconnected elements including at least one Advanced Mezzanine Card (AMC) module (analogous to the payload card 104), at least one MicroTCA carrier hub (MCH) (analogous to the switch card 108) and the interconnect, power, cooling and mechanical resources needed to support them. A typical prior art MicroTCA system may consist of twelve AMC modules, one (and optionally two for redundancy) MCH's coupled to a backplane 103. AMC modules are specified in the Advanced Mezzanine Card Base Specification (PICMG® AMC.0 RC1.1 and subsequent revisions). MCH's are specified in the MicroTCA specification—MicroTCA.0 Draft 0.9—Micro Telecom Compute Architecture Base Specification (and subsequent revisions).

A MCH acts as a virtual carrier card which emulates the requirements of the carrier card defined in the Advanced Mezzanine Card Base Specification (PICMG® AMC.0 RC1.1) to properly host AMC modules. Carrier card functional requirements include power delivery, interconnects, Intelligent Platform Management Interface (IPMI) management, and the like. MCH combines the control and management infrastructure, interconnect fabric resources and the power control infrastructure for the AMC modules into a single unit. A MCH comprises these common elements that are shared by all AMC modules and is located on the backplane 103, on one or more AMC modules, or a combination thereof. As stated above, the MCH is analogous to a switching device that includes a switch card and switching elements coupled to the switch card.

Figure 2:
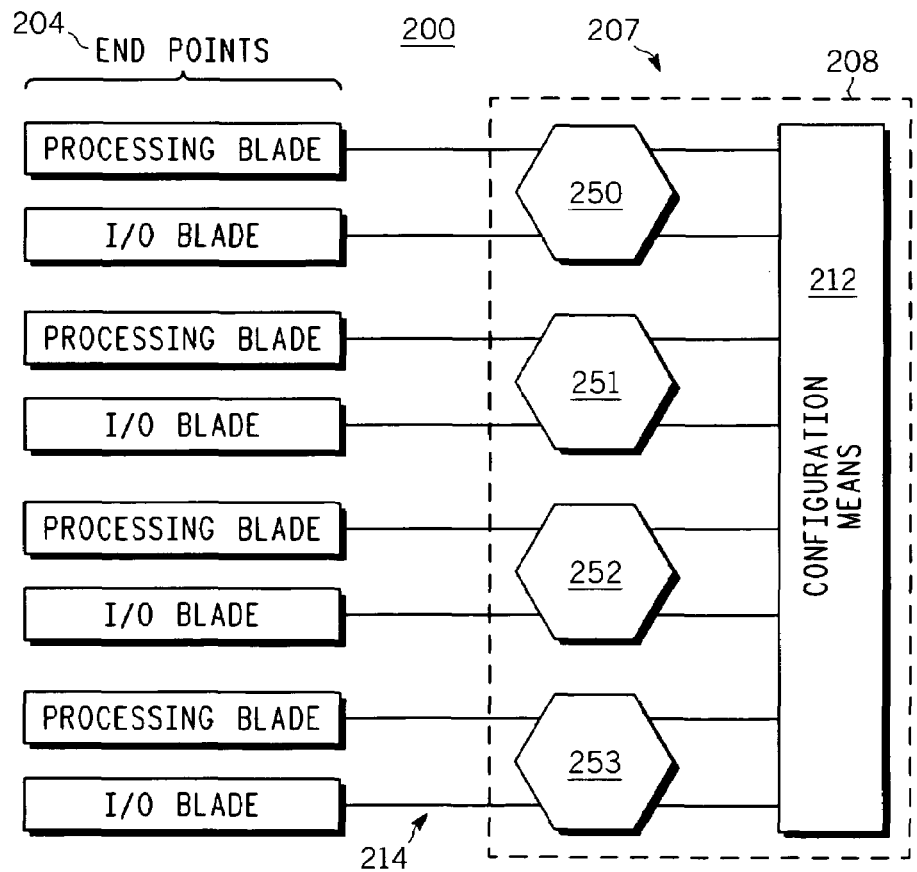
FIG. 2 representatively illustrates a logical representation of a computer system in accordance with an exemplary embodiment of the present invention.

FIG. 2 representatively illustrates a logical representation of a computer system 200 in accordance with an exemplary embodiment of the present invention. Computer system 200 may include a configurable switching device 207 coupled to any number of endpoints 204, wherein endpoints 204 may be payload cards as described with reference to FIG. 1 or may be other processing and/or input/output devices located on a backplane or a motherboard. For example, endpoints 204 can include, processing blades, input/output (I/O) blades, rear transition modules, devices placed directly on the backplane/motherboard, and the like.

Configurable switching device 207 may include switch card 208 coupled to interface with backplane 103. Switch card 208 may have a form factor such that it engages with computer chassis 101 and backplane 103 as described with reference to FIG. 1. A plurality of PCI-Express switching elements 250-253, may be coupled to switch card 208. In an embodiment, switch card 208 may instead by a switch platform located on the backplane 103 or on a motherboard of a computer.

PCI-Express is an I/O interconnect bus standard (which includes a protocol and a layered architecture) that expands on and doubles the data transfer rates of original PCI. PCI-Express is a two-way, serial connection that carries data in packets along two pairs of point-to-point data lanes, compared to the single parallel data bus of traditional PCI that routes data at a set rate. In an embodiment, and not limiting of the invention, bit rates for PCI Express reach 2.5 Gigabits per second (Gb/s) to 20 Gb/s per lane direction, which equate to data transfer rates of approximately 200 MB/s. However, the present invention is not limited to implementation by any particular bit rate of the PCI-Express protocol, and any bit rate of the PCI-Express protocol is within the scope of the invention.

The PCI-Express system may comprise a root complex, endpoints 204 and one or more PCI-Express switching elements 250-253. The PCI-Express switching element 250-253 replaces the multi-drop bus and is used to provide fan-out for the I/O bus. The PCI-Express switching element 250-253 provides peer-to-peer communication between different endpoint 204 and does not require traffic to be forwarded to the host bridge if it does not involve cache-coherent memory transfers. PCI-Express no longer uses a single parallel data bus through which all data is routed at a set rate (like its predecessor PCI). Rather, an assembly of serial, point-to-point wired, individually clocked 'lanes' each consisting of two pairs of data lines carries data upstream and downstream.

A PCI-Express fabric is composed of point-to-point PCI-Express links 214 that interconnect a set of components in a hierarchy—composed of a root complex, multiple endpoints 204, at least one PCI-Express switching element 250-253. Each of the components is mapped in a single flat address space and may be accessed using PCI-like load/store accesses transaction semantics. The basic PCI-Express link 214 includes dual unidirectional differential Links, implemented as a transmit pair and a receive pair.

In PCI-Express, a root complex denotes the root of an I/O hierarchy that connects a CPU/memory subsystem to the I/O. The I/O hierarchy defines the tree structured PCI-Express I/O interconnect topology. A root complex may support one or more PCI-Express ports that connect to one or more PCI-Express links 214. Each interface with the root complex may define a separate hierarchy, where each hierarchy may be composed of a single endpoint or a sub-hierarchy containing one or more PCI-Express switching elements 250-253 and endpoints 204.

Endpoints 204, in addition to the above description, refer to types of devices that can be the requester or completer of a PCI-Express transaction either on its own behalf or on behalf of a distinct non-PCI-Express device.

A PCI-Express switching element 250-253 may be defined as a logical assembly of multiple virtual PCI-to-PCI bridge devices. PCI-Express switches appear to configuration software as two or more logical PCI-to-PCI bridges and forward transactions using PCI bridge mechanisms, e.g. address based routing.

A PCI Express-PCI Bridge provides a connection between a PCI-Express fabric and a PCI/PCI-X hierarchy. Each PCI-Express link 214 is mapped through a virtual PCI-to-PCI Bridge structure and has a logical PCI bus associated with it. The virtual PCI-to-PCI Bridge structure may be part of a PCI-Express root complex port, a switch upstream port, or a switching element downstream port. A root port is a virtual PCI-to-PCI bridge structure that originates a PCI-Express hierarchy from a PCI-Express root complex. Logical devices are mapped into configuration space such that each will respond to a particular device number.

A configuration means 212 may be coupled to plurality of PCI-Express switching elements (250-253 and switch card 208). In an embodiment, configuration means is operable to configure and reconfigure plurality of PCI-Express switching elements 250-253 to operate in a plurality of directional fabric domains, where each of the plurality of PCI-Express switching elements 250-253 operates in only one of the plurality of directional fabric domains at a time.

In an embodiment, a directional fabric domain has its own separate and unique root complex and operates separately from other directional fabric domains in a computer chassis 101. In other words, each directional fabric domain has its own centralized resource in charge of management and control of the domain (i.e. each domain has its own root complex). In an embodiment, directional fabric domain may be a PCI-Express fabric.

In general, the wiring in backplane 103 is fixed at the time of manufacture and cannot be modified by a user. A user may desire more than one directional fabric domain in a computer chassis and also may desire to reconfigure the size of each directional fabric domain in the computer chassis 101. However, providing a different backplane 103 for each configuration is inefficient for the manufacturer and seller of backplane 103 and is expensive for a user who desires to upgrade a computer system to a different configuration. Since the wiring configuration of backplane 103 is fixed, configurable switching device 207 provides a user the ability to configure and reconfigure switching elements 250-253 to operate in a plurality of directional fabric domains.

In an embodiment, configuring means 212 allows configurable switching device 207 to be configured and reconfigured in a post-manufactured state. Any configuring or reconfiguring occurring after the initial manufacturing of configurable switching device 207 can be considered reconfiguring in the post-manufactured state. For example, and without limitation, reconfiguring of configurable switching device 207 that occurs after one or more PCI-Express switching elements 250-253 are coupled to a given configuration of a plurality of directional fabric domains can be considered reconfiguring in a post-manufactured state.

Configuring means 212 can be implemented using hardware, software, or hardware implementing software. Configuring means 212 may be manually reconfigurable using mechanical means or software reconfigurable using any combination of hardware or software. For example, and without limitation, configuring means 212 can be implemented in hardware using resistor stuffing, header blocks or a passive mezzanine card or connector on switch card 208. In an embodiment, resistor stuffing can include soldering/removing resistors after manufacture to configure/reconfigure configurable switching device 207. In another embodiment, configuring means 212 can include using shorting blocks such that a given set of jumper connections between one or more of plurality of PCI-Express switching elements 250-253. In still another embodiment, configuring means 212 can be a connector such that an expansion card or mezzanine card can be used to configure/reconfigure plurality of PCI-Express switching elements 250-253. In this embodiment, mezzanine card can be designed such that plurality of PCI-Express switching elements 250-253 are configured to provide the desired size and number of directional fabric domains within computer chassis 101.

In still yet another embodiment, configuring means 212 can include a processor, memory and a set of operating instructions to configure/reconfigure plurality of PCI-Express switching elements 250-253 to operate in a plurality of directional fabric domains. Operating instructions, or software, can be programmed and reprogrammed into configuring means 212 in a post-manufactured state.

In an embodiment of the invention, configuration means 212 is user-reconfigurable. In operation, configurable switching device 207 may be removed from computer chassis 101, reconfigured by a user, and re-inserted into computer chassis 101. This offers the advantage of flexibility and low cost as configurable switching device 207 can be easily reconfigured by a user to adapt changes desired by a user.

The exemplary embodiments of configuring means 212 discussed above are not limiting of the invention. Any configuring means 212 is within the scope of the invention.

Figure 3:
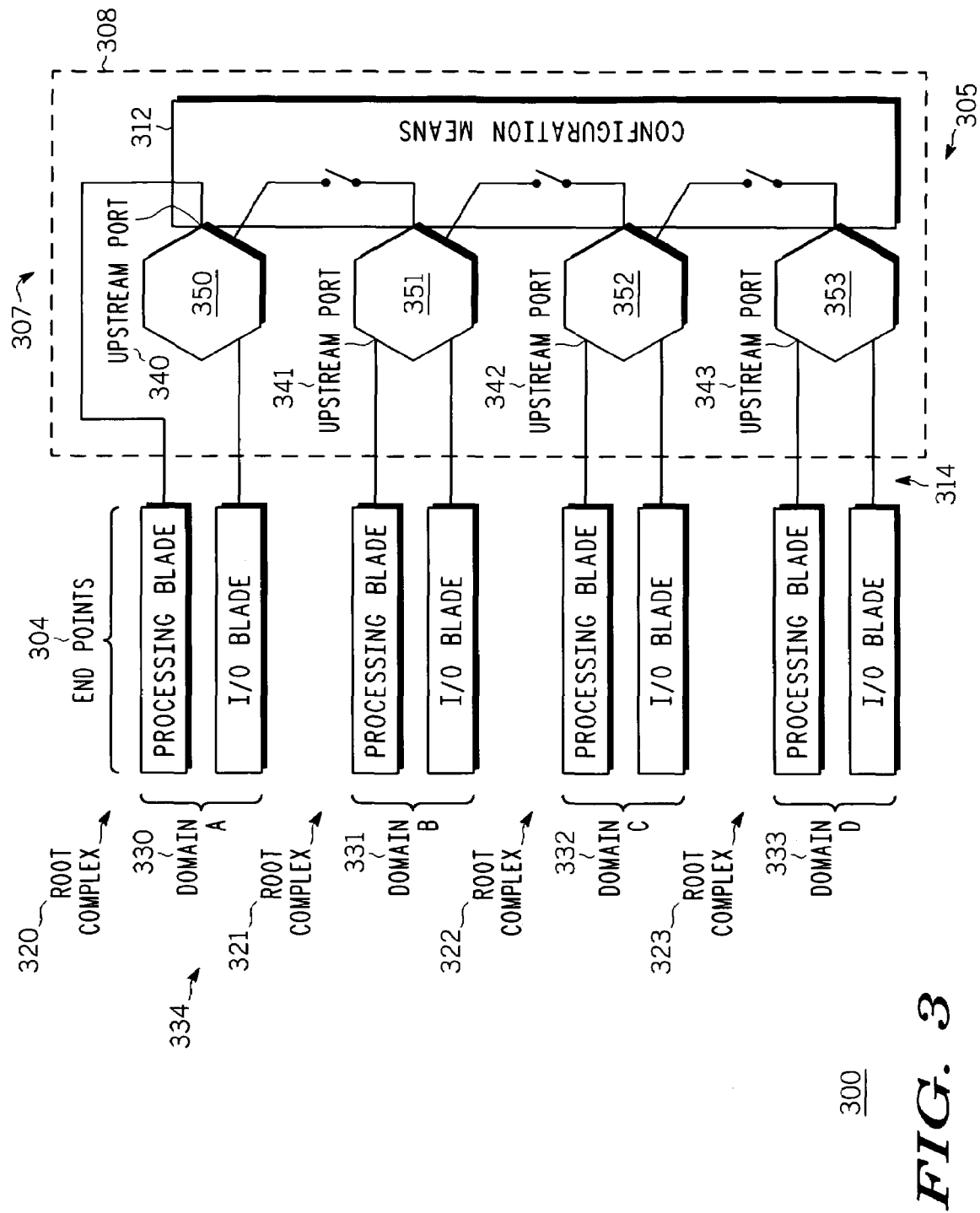
FIG. 3 representatively illustrates a logical representation of a computer system in accordance with another exemplary embodiment of the present invention.

FIG. 3 representatively illustrates a logical representation of a computer system 300 in accordance with another exemplary embodiment of the present invention. The computer system 300 shown in FIG. 3 is in a first configuration 305 as plurality of PCI-Express switching elements 350-353 on switch card 308 are configured to operate in a plurality of directional fabric domains 334. In an embodiment, switch card 308 may instead by a switch platform located on the backplane 103 or on a motherboard of a computer.

Configuration means 312 configures plurality of PCI-Express switching elements 350-353 each to operate in their own separate directional fabric domain. For example, PCI-Express switching element 350 is coupled to operate in Domain A 330 with root complex 320, where root complex 320 is selected from endpoints 304. PCI-Express switching element 351 is coupled to operate in Domain B 331 with root complex 321. PCI-Express switching element 352 is coupled to operate in Domain C 332 with root complex 322. PCI-Express switching element 353 is coupled to operate in Domain D 333 with root complex 323. As can be seen, each of plurality of directional fabric domains has its own unique root complex.

In first configuration 305, each PCI-Express switching element 350-353 has its upstream port 340-343 connected to a root complex. The upstream port is the port on a PCI-Express switching element that is closest topologically to the root complex. Upstream is the directional flow of information where the information is flowing towards the root complex. Ports on a PCI-Express switching element that are not an upstream port, are downstream ports as information flowing out of downstream ports is flowing away from the root complex.

Figure 4:
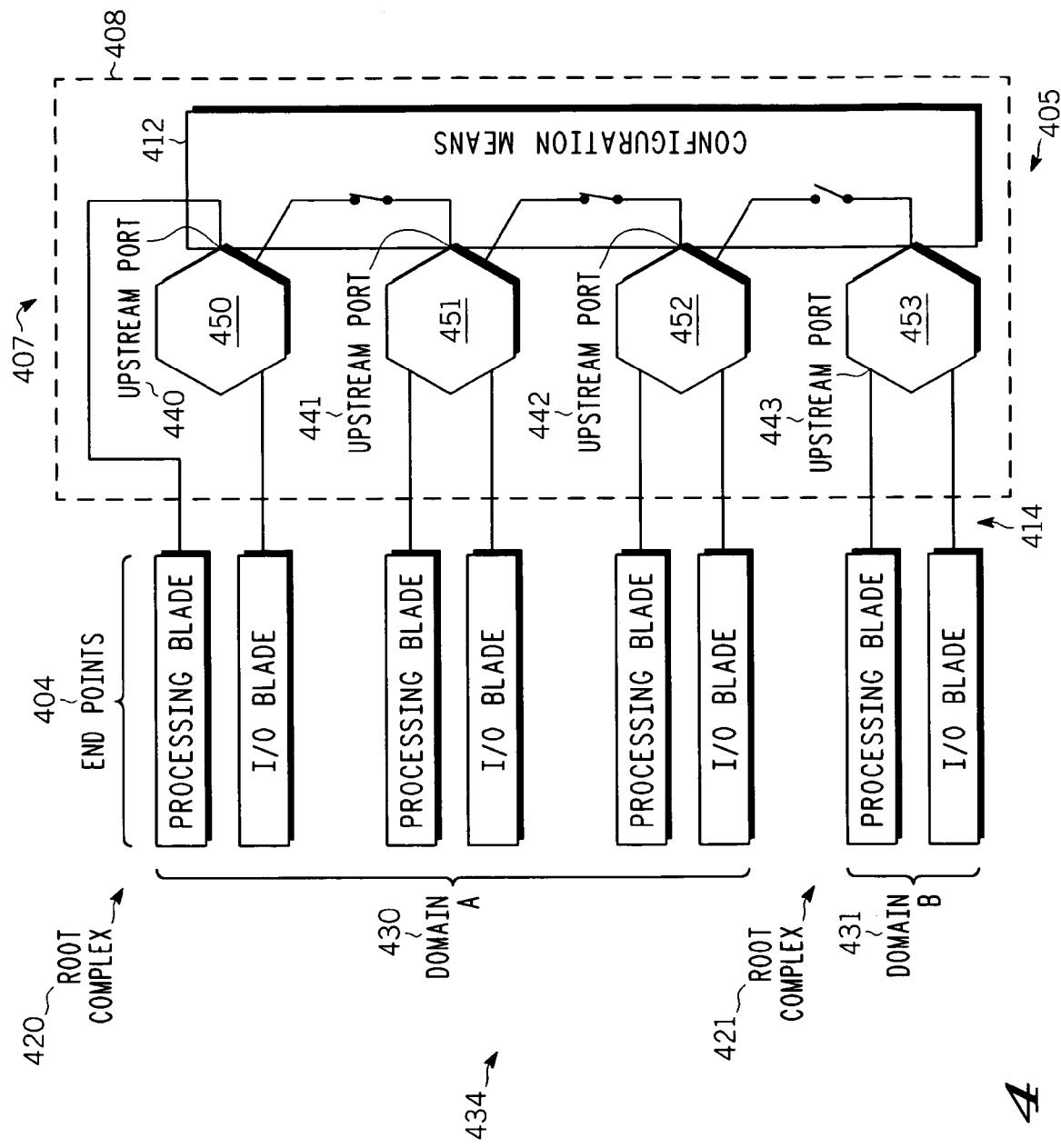
FIG. 4 representatively illustrates a logical representation of a computer system in accordance with yet another exemplary embodiment of the present invention.

FIG. 4 representatively illustrates a logical representation of a computer system 400 in accordance with yet another exemplary embodiment of the present invention. The computer system 400 shown in FIG. 4 is in a second configuration 405 as plurality of PCI-Express switching elements 450-453 on switch card 408 are configured to operate in a plurality of directional fabric domains 434, where the plurality of directional fabric domains 434 shown in FIG. 4 are different from the plurality of directional fabric domains 334 depicted in FIG. 3. In an embodiment, switch card 408 may instead by a switch platform located on the backplane 103 or on a motherboard of a computer.

Configuration means 412 configures plurality of PCI-Express switching elements 450-453 each to operate different directional fabric domains than those shown in FIG. 3. For example, PCI-Express switching elements 450, 451, 452 are coupled to operate in Domain A 430 with root complex 420, where root complex 420 is selected from endpoints 404. PCI-Express switching element 453 is coupled to operate in Domain B 431 with root complex 421. As can be seen, each of plurality of directional fabric domains has its own unique root complex.

In the embodiment, of FIG. 4, there are only two directional fabric domains as opposed to the four directional fabric domains shown in FIG. 3. In second configuration 405, PCI-Express switching element 452 has its upstream port 442 connected to PCI-Express switching element 451, and PCI-Express switching element 451 has its upstream port 441 connected to PCI-Express switching element 450, while PCI-Express switching element 450 has it's upstream port 440 connected to root complex 420. The PCI-Express switching element 453 in the Domain B 431 has its upstream port 443 connected to its root complex 421.

As can be seen from FIGS. 3 and 4, configuring means may be used to configure/reconfigure plurality of PCI-Express switching elements to operate in a plurality of directional fabric domains. This may be done manually or with software and by a user in a post-manufactured state. This allows the same configurable switching device to be used in a variety of PCI-Express fabric configurations, thereby saving the time and expense of acquire and/or stocking switch devices uniquely configured to only one operating configuration.

The first and second configurations shown in FIGS. 3 and 4 respectively are not limiting of the invention. Configurable switching device may include any number of PCI-Express switching elements, which may be configured and reconfigured into any plurality of directional fabric domains and be within the scope of the invention. Further, the number and type of endpoints depicted in FIGS. 3 and 4 are exemplary and not limiting of the invention. Any number and type of endpoints may be included and be within the scope of the invention.

In the foregoing specification, the invention has been described with reference to specific exemplary embodiments. However, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A configurable switching device, comprising:
   a switch card coupled to interface with a backplane of a computer chassis;
   a plurality of PCI-Express switching elements coupled to the switch card; and
   a configuration means coupled to the switch card, wherein the configuration means is operable to configure and reconfigure the plurality of PCI-Express switching elements to operate in a plurality of directional fabric domains, and wherein each of the plurality of PCI-Express switching elements operate in only one of the plurality of directional fabric domains at a time.

2. The configurable switching device of claim 1, wherein the configuration means is operable in a post-manufactured state to reconfigure the plurality of PCI-Express switching elements from a first configuration to a second configuration.

3. The configurable switching device of claim 1, wherein the configuration means is user-reconfigurable.

4. The configurable switching device of claim 1, wherein the configuration means is manually reconfigurable.

5. The configurable switching device of claim 1, wherein the configuration means is software reconfigurable.

6. The configurable switching device of claim 1, wherein each of the plurality of directional fabric domains is coupled to a unique root complex.

7. The configurable switching device of claim 1, wherein each of the plurality of directional fabric domains comprises at least one PCI-Express link.

8. A configurable switching device, comprising:
  a switch card coupled to interface with a backplane of a computer chassis;
  a plurality of PCI-Express switching elements coupled to the switch card, wherein the plurality of PCI-Express switching elements are in a first configuration to operate in a plurality of directional fabric domains; and
  a configuration means coupled to the switch card, wherein the configuration means is operable to reconfigure the plurality of PCI-Express switching elements to a second configuration to operate in the plurality of directional fabric domains, wherein the first configuration is different from the second configuration, and wherein each of the plurality of PCI-Express switching elements operate in only one of the plurality of directional fabric domains at a time.

9. The configurable switching device of claim 8, wherein the configuration means is operable in a post-manufactured state to reconfigure the plurality of PCI-Express switching elements from the first configuration to the second configuration.

10. The configurable switching device of claim 8, wherein the configuration means is user-reconfigurable.

11. The configurable switching device of claim 8, wherein the configuration means is manually reconfigurable.

12. The configurable switching device of claim 8, wherein the configuration means is software reconfigurable.

13. The configurable switching device of claim 8, wherein each of the plurality of directional fabric domains is coupled to a unique root complex.

14. The configurable switching device of claim 8, wherein each of the plurality of directional fabric domains comprises at least one PCI-Express link.

15. A method of reconfiguring a configurable switching device, comprising:
  providing a switch card coupled to interface with a backplane of a computer chassis;
  providing a plurality of PCI-Express switching elements coupled to the switch card, wherein the plurality of PCI-Express switching elements are in a first configuration to operate in a plurality of directional fabric domains; and
  operating a configuration means coupled to the switch card to reconfigure the plurality of PCI-Express switching elements to a second configuration to operate in the plurality of directional fabric domains, wherein the first configuration is different from the second configuration, and wherein each of the plurality of PCI-Express switching elements operate in only one of the plurality of directional fabric domains at a time.

16. The method of claim 15, wherein the configuration means is operable in a post-manufactured state to reconfigure the plurality of PCI-Express switching elements from the first configuration to the second configuration.

17. The method of claim 15, wherein the configuration means is user-reconfigurable.

18. The method of claim 15, wherein the configuration means is manually reconfigurable.

19. The method of claim 15, wherein the configuration means is software reconfigurable.

20. The method of claim 15, wherein each of the plurality of directional fabric domains is coupled to a unique root complex.

21. The method of claim 15, wherein each of the plurality of directional fabric domains comprises at least one PCI-Express link.

22. A configurable switching device, comprising:
  a switching platform on one of a backplane and a motherboard;
  a plurality of PCI-Express switching elements coupled to the switch platform; and
  a configuration means coupled to the switch platform, wherein the configuration means is operable to configure and reconfigure the plurality of PCI-Express switching elements to operate in a plurality of directional fabric domains, and wherein each of the plurality of PCI-Express switching elements operate in only one of the plurality of directional fabric domains at a time.

23. The configurable switching device of claim 22, wherein the configuration means is operable in a post-manufactured state to reconfigure the plurality of PCI-Express switching elements from a first configuration to a second configuration.

24. The configurable switching device of claim 22, wherein the configuration means is user-reconfigurable.

25. The configurable switching device of claim 22, wherein the configuration means is manually reconfigurable.

26. The configurable switching device of claim 22, wherein the configuration means is software reconfigurable.

27. The configurable switching device of claim 22, wherein each of the plurality of directional fabric domains is coupled to a unique root complex.

28. The configurable switching device of claim 22, wherein each of the plurality of directional fabric domains comprises at least one PCI-Express link.

* * * * *

UNITED STATES PATENT AND TRADEMARK OFFICE
CERTIFICATE OF CORRECTION

PATENT NO. : 7,516,263 B2 Page 1 of 1
APPLICATION NO. : 11/364418
DATED : February 27, 2006
INVENTOR(S) : Douglas L. Sandy et al.

It is certified that error appears in the above-identified patent and that said Letters Patent is hereby corrected as shown below:

Column 1,
Line 13, "PCI Express" should be --PCI-Express--.

Signed and Sealed this

Seventh Day of July, 2009

JOHN DOLL
*Acting Director of the United States Patent and Trademark Office*